Jan. 1, 1963  A. WEEDFALD  3,070,903
CONTRACT BRIDGE BIDDING GUIDE
Filed May 23, 1960  7 Sheets-Sheet 1
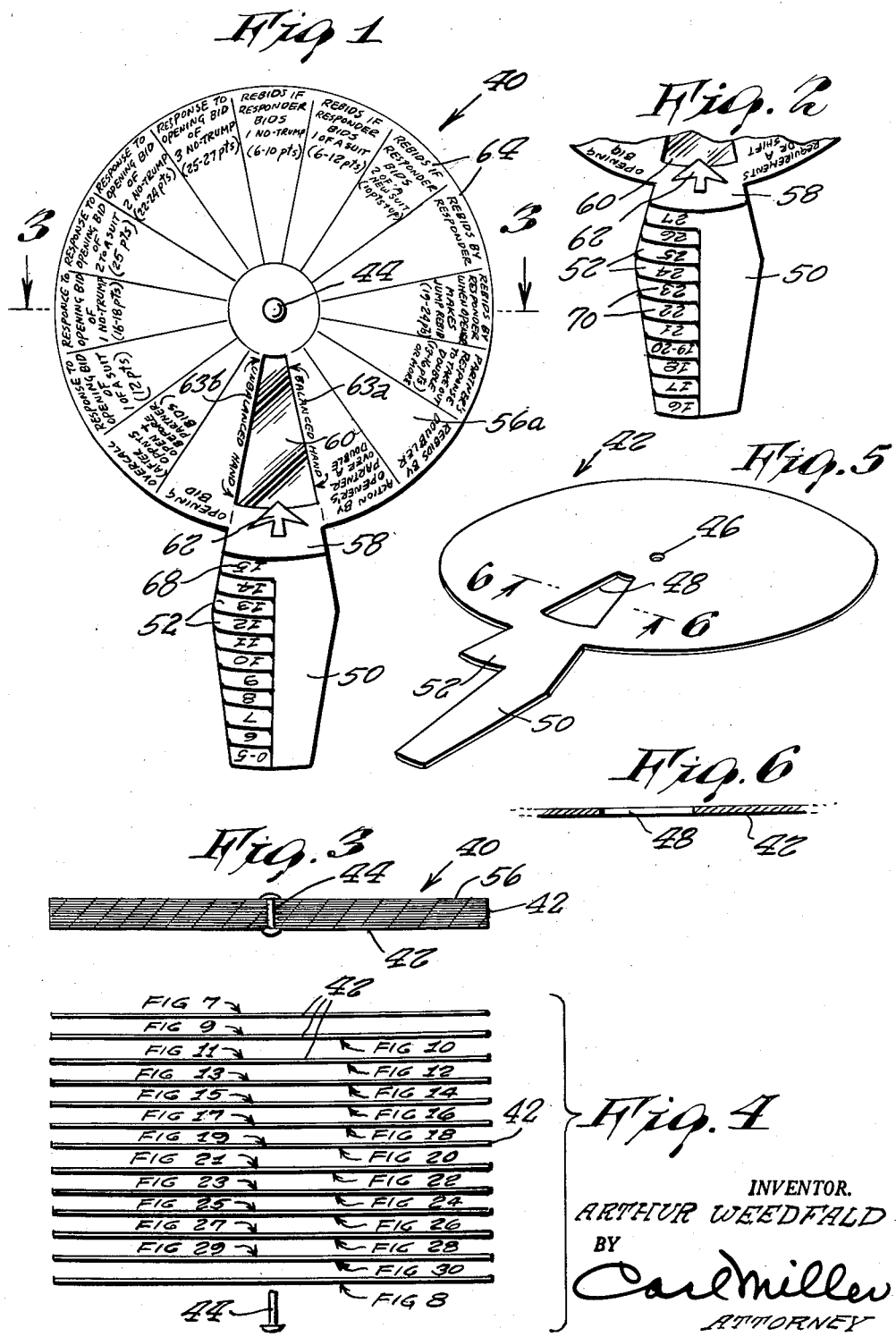
INVENTOR.
ARTHUR WEEDFALD
BY
Carl Miller
ATTORNEY Jan. 1, 1963  A. WEEDFALD  3,070,903
CONTRACT BRIDGE BIDDING GUIDE
Filed May 23, 1960  7 Sheets-Sheet 2

INVENTOR.
ARTHUR WEEDFALD
BY
Carl Miller
ATTORNEY

INVENTOR.
ARTHUR WEEDFALD
BY Carl Miller
ATTORNEY

Jan. 1, 1963

A. WEEDFALD 3,070,903

CONTRACT BRIDGE BIDDING GUIDE

Filed May 23, 1960

INVENTOR.
ARTHUR WEEDFALD
BY
Carl Miller
ATTORNEY

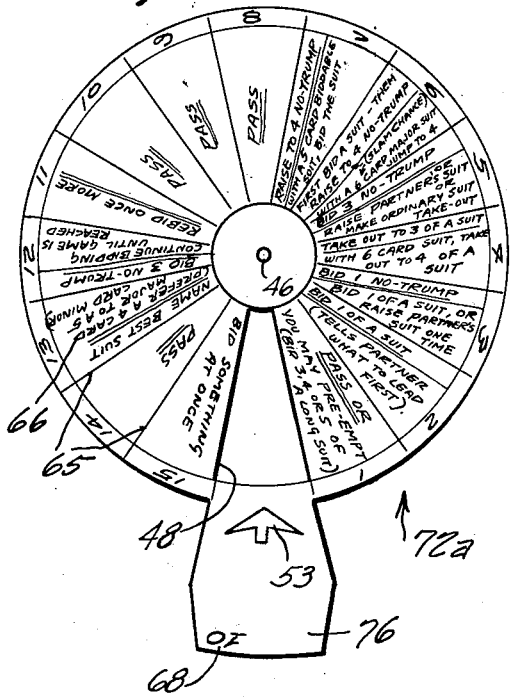

INVENTOR.
ARTHUR WEEDFALD
BY
Carl Miller
ATTORNEY

Jan. 1, 1963
A. WEEDFALD
3,070,903
CONTRACT BRIDGE BIDDING GUIDE
Filed May 23, 1960
7 Sheets-Sheet 7
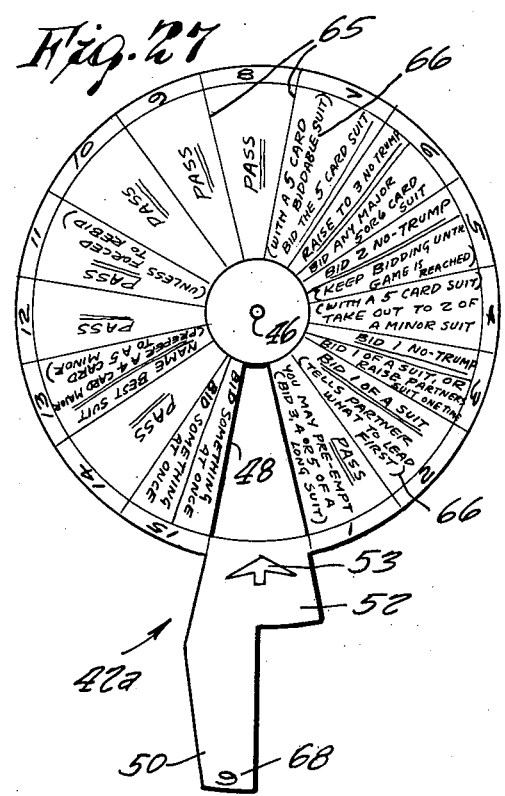
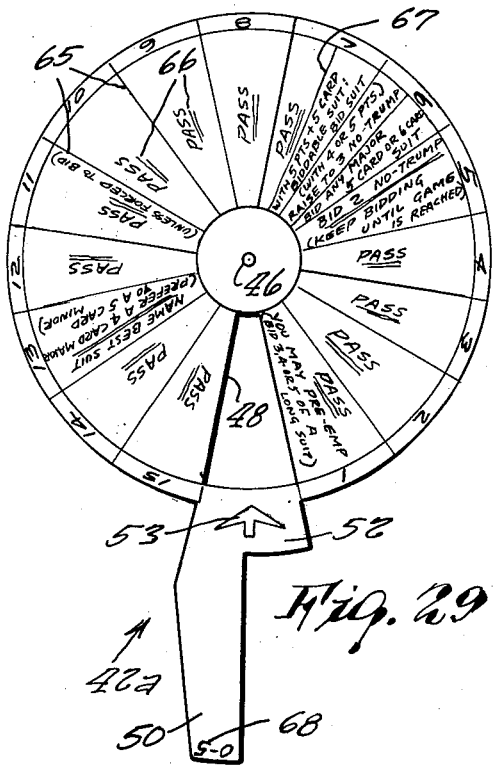
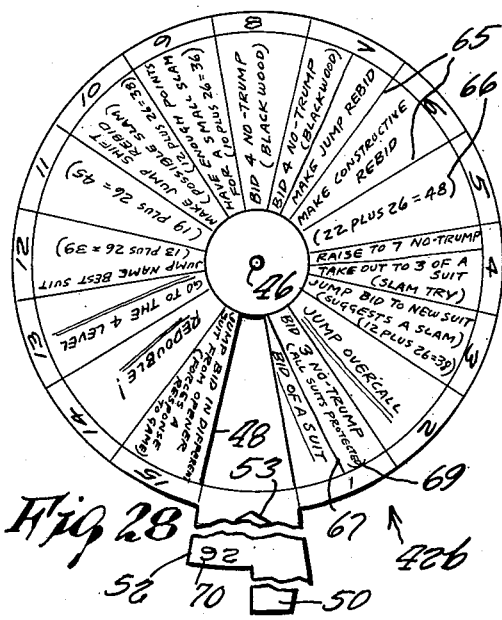
INVENTOR.
ARTHUR WEEDFALD
BY
Carl Miller
ATTORNEY

United States Patent Office 3,070,903
Patented Jan. 1, 1963

3,070,903
CONTRACT BRIDGE BIDDING GUIDE
Arthur Weedfald, 19 Thames Blvd., Bergenfield, N.J.
Filed May 23, 1960, Ser. No. 30,956
8 Claims. (Cl. 35—8)

This invention relates to card games and, more particularly, to the game of contract bridge.

The bidding part of contract bridge is extremely important and requires the utmost skill of the players. Various bidding systems have been developed, such as the U.S. point count system. It is therefore an object of the present invention to provide a contract bridge bidding guide which can be conveniently and effectively used to suggest a proper bid in response to prior bids during play.

Another object of the present invention is to provide a contract bridge bidding guide based upon the U.S. point count system which will provide for practically any previous bid based upon the user's hand to direct or suggest a proper bid either as a first bid or a responsive bid during play.

Still an additional object of the present invention is to provide a contract bridge bidding guide of the type described which is extremely simple to use, extremely scientific, and which can be used with a minimum amount of practice and experience.

Still a further object of the present invention is to provide a contract bridge bidding guide which can be manufactured in large quantities at a relatively low cost, and which can be used as a basis for establishing responsive bidding between partners.

A more specific object of the present invention is to provide a contract bridge bidding guide of the above type which is provided with a sufficient number of indicators and selections to allow for fast and effective decisions in making proper bids in response to prior bids during play.

All of the foregoing and still further objects and advantages of this invention will become apparent from a study of the following specification, taken in connection with the accompanying drawing, wherein:

FIGURE 1 is a top plan view of a contract bridge bidding guide made in accordance with the present invention in an initial position ready for use;

FIGURE 2 is a fragmentary plan view of the opposite side of the device shown in FIGURE 1;

FIGURE 3 is a transverse cross sectional view taken along line 3—3 of FIGURE 1;

FIGURE 4 is an exploded end view of the device shown in FIGURE 3;

FIGURE 5 is a perspective view of a bid plate forming a part of the present invention;

FIGURE 6 is an enlarged fragmentary cross sectional view taken along line 6—6 of FIGURE 5; and FIGURES 7 through 30 are plan views of each of the surfaces referred to by the references in FIGURE 4 of the drawing, illustrating in detail each of the component parts of the present invention.

Figure 7:
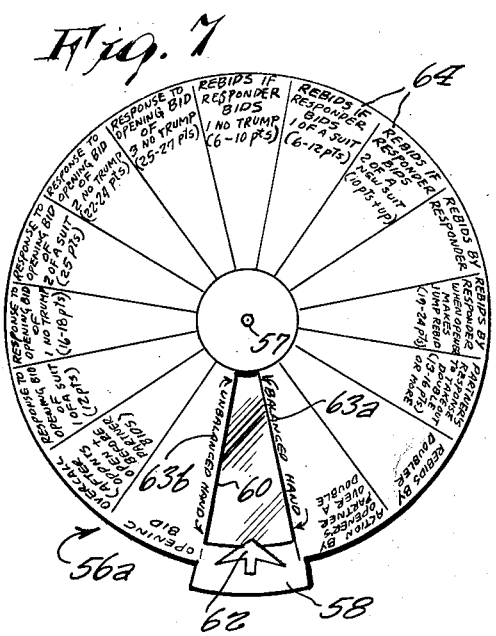
Figure 8:
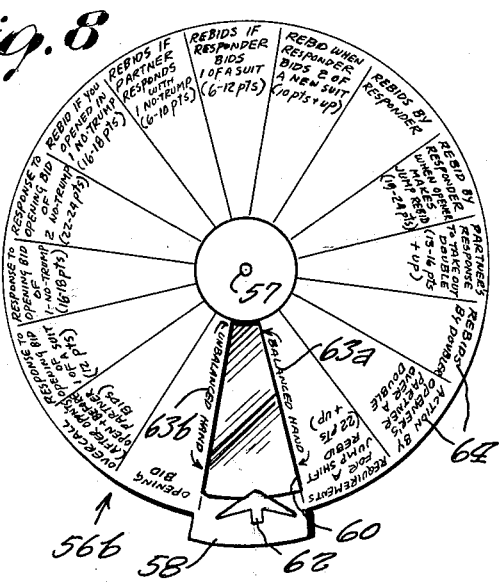
Figure 9:
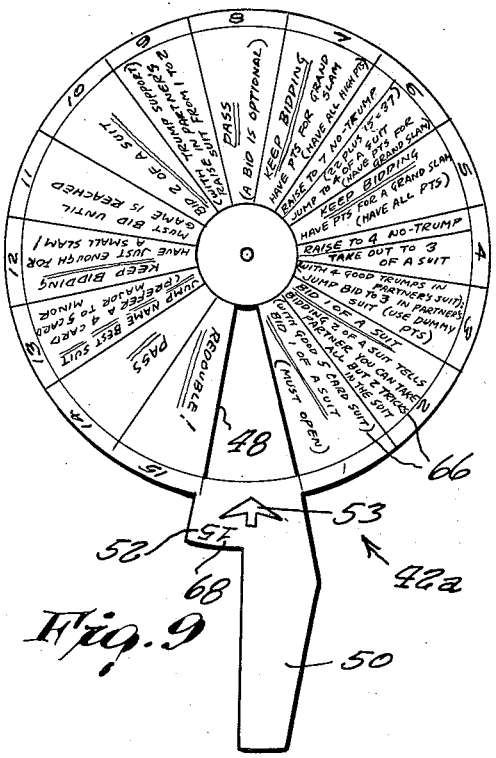
Figure 10:
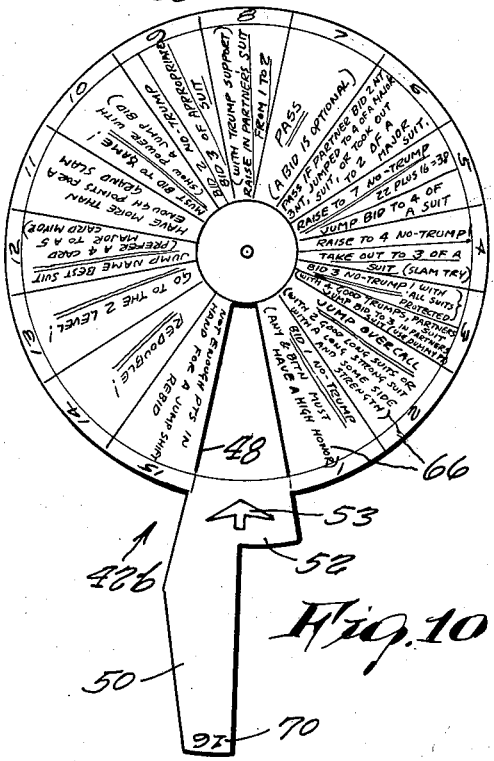
Figure 11:
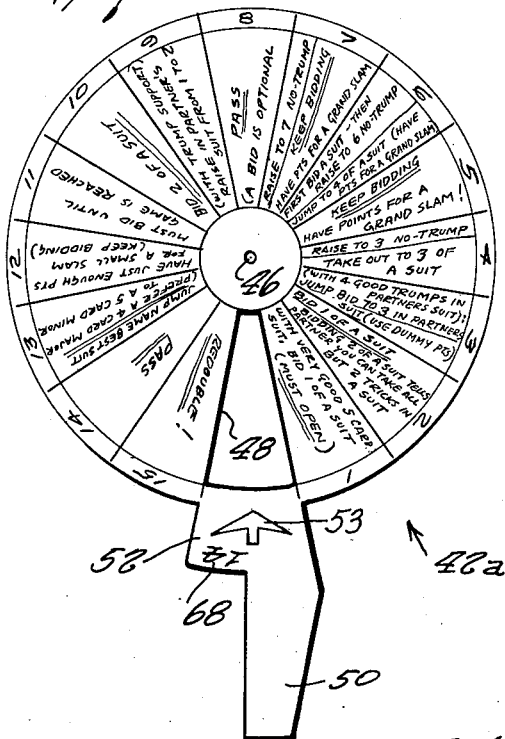
Figure 12:
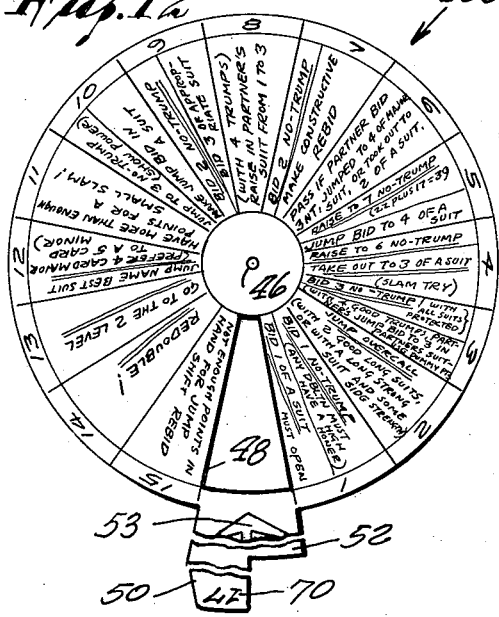
Figure 13:
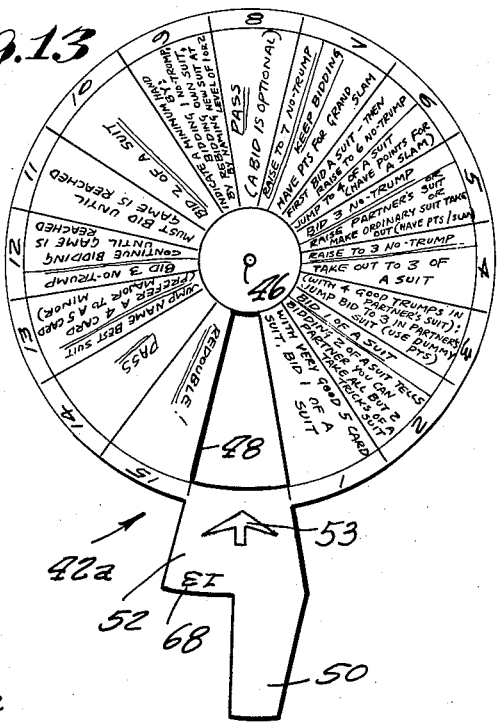
Figure 14:
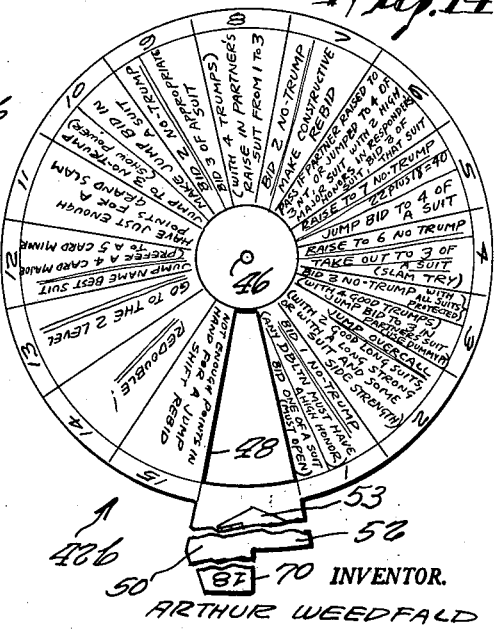
Figure 15:
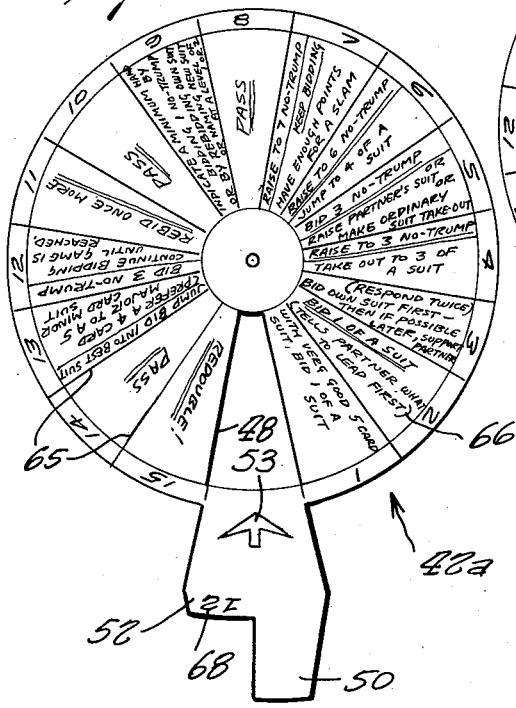
Figure 17:
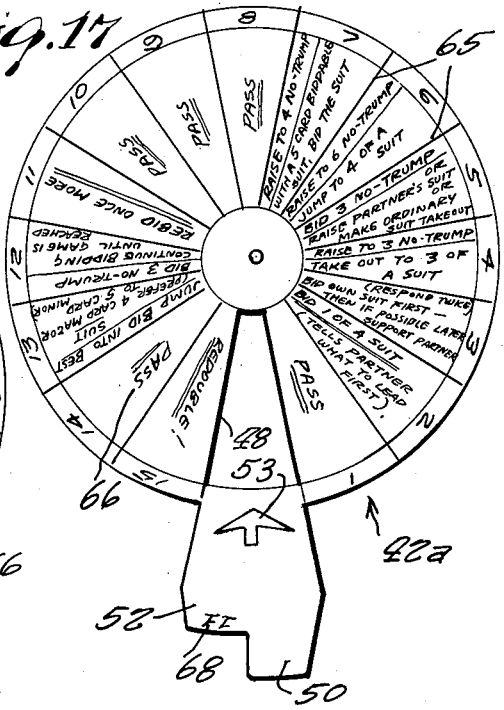
Figure 16:
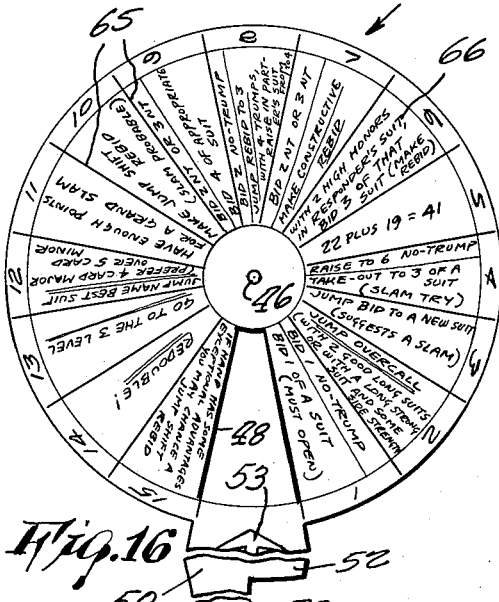
Figure 18:
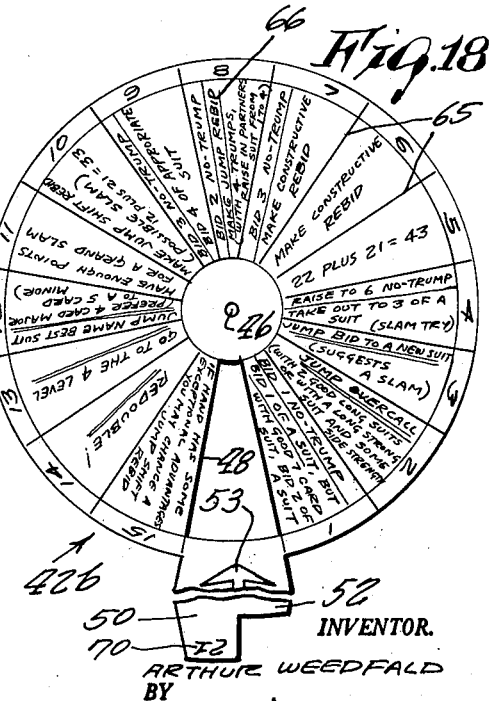
Figure 23:
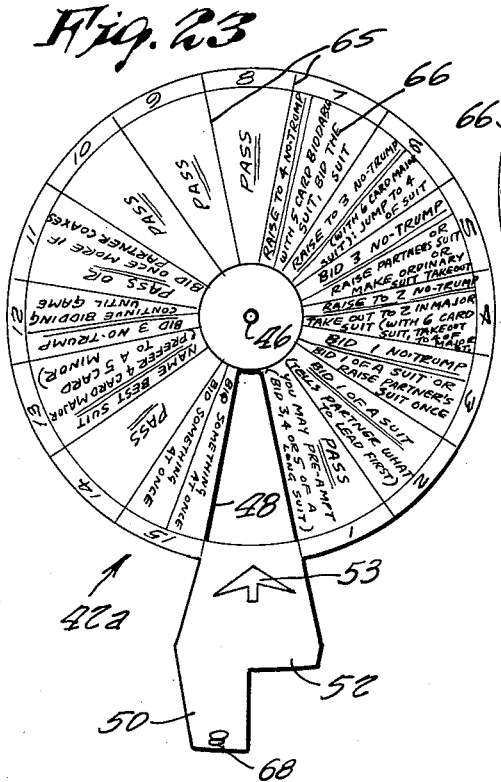
Figure 24:
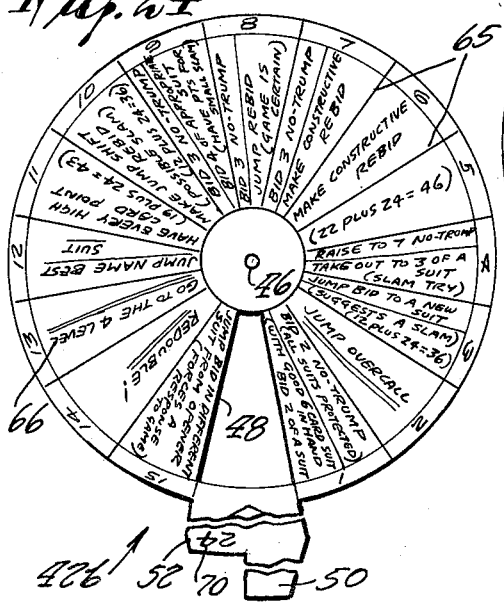
Figure 25:
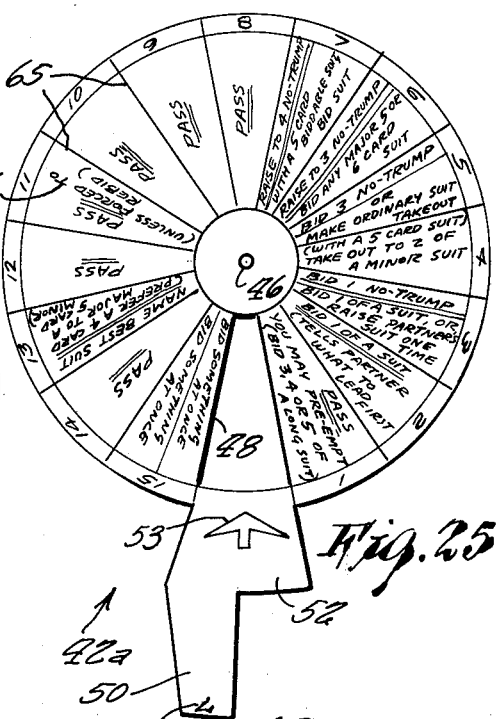
Figure 26:
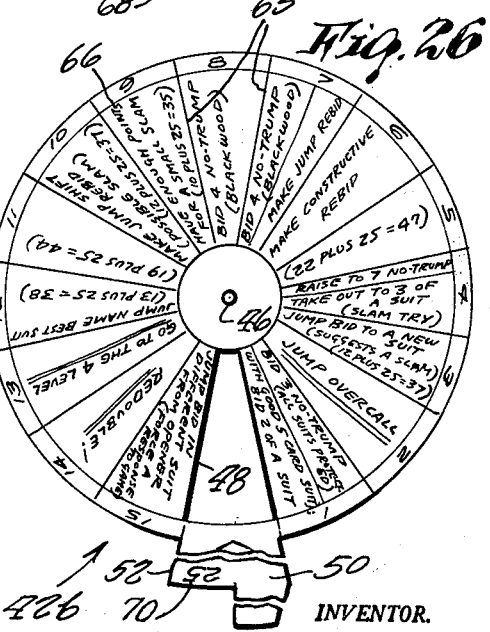

Referring now to the drawing, a contract bridge bidding guide 40 made in accordance with the present invention is shown to include a stack of bid plates 42, each having a substantially circular central portion with a central opening 46 through which a bearing pin 44, such as a fastener or rivet, is received. Thus, each of the bid plates 42 is rotatable relative to the other such bid plates.

Each bid plate 42 is further provided with a radially extending window opening 48, for purposes hereinafter described, and a radially outwardly extending tab that is divided into two discrete sections 50, 52, the section 50 designating the relatively longer section and section 52 designating the relatively shorter section of each tab, the length of each such section 50, 52, being inversely proportional to the length of the other one of the tab sections. Thus, the numerical designation of the point count in the bidder's hand may be imprinted on the respective tab portions 50, 52, in the following manner. As is clearly shown in FIGURES 1 and 2 of the drawing, numbers 68 designating the point count from zero to fifteen are imprinted upon tab sections 50 and 52, so as to be visible from one side of the assembly, whereas the remaining numbers 70 designating the point count from sixteen to twenty-seven are imprinted upon the opposite side of the tab sections 50 and 52. As a result, when the device is in the normally collapsed position shown in FIGURES 1 and 2, the particular point count corresponding to the hand of the bidder may be readily located with reference to the tab portion 50, 52. Each radially extending tab is further provided with a pointer 53 which is used to designate a selected prior bid 64 in the plurality of circumferentially spaced apart areas of the cover sheet 56 which is similarly provided with central openings 57 for receiving the mounting pin 44 therethrough. A pair of these cover sheets 56a, 56b, are provided, one on each end of the stack of bid plates 42, each having identical indicia 64 imprinted thereupon with a pointer 62 mounted upon a radially outwardly extending tab 58 adjacent to a window opening 60 through which various balanced hand and unbalanced hand information may be read adjacent window edges 63a, 63b of window opening 60 from the individual sets of suggested bids 66 in the circumferentially spaced apart areas delineated by radial lines 65 on both sides 42a, 42b of the respective bid plates 42. Some of these areas defined by the radially extending lines 65 are further divided by an additional radially extending line 67 into two separate areas which may be associated with the balanced and unbalanced hand indicia exposed adjacent window edges 63a, 63b on the cover sheets.

The center of the stack of bid sheets is provided with a unique bid plate 42 having oppositely facing sides 72a, 72b and a radially outwardly extending tab 76 of symmetrical configuration with the numerical indicia 68, 70 imprinted upon the opposite sides thereof adjacent to a pointer 53 of the window opening 48. This plate 42 is also provided with a central opening 46 for rotatably receiving the mounting pin 44 therethrough. Radially extending lines 65 also divide both sides of this bid plate into individual areas, each of which is provided with suggested bid indicia 66. Since this bid plate 42 is at the exact center of the stack, the tab 76 is symmetrical so that the indicia 68, 70 on both sides is readable in its respective position as shown in FIGURES 1 and 2.

The operation of this device will now be readily understood. With the parts in the normally closed position shown in FIGURE 1, the player will select the tab 50, 52 having the indicia 68, 70 corresponding to the U.S. point count of his hand, and rotate the entire stack of plates above the selected plate relative to the remainder of the stack therebeneath until the arrow 53, imprinted thereupon confronts the particular indicia 64 designating the prior bids of the play which are to be used as the reference point. As soon as this is done, the suggested bid consisting of the indicia 66 on the respective one of the bid plates 42 is visible through the aligned window openings 48 in the stack of bid plates and the window opening 60 of the cover sheet. The bidder in some instances will choose between the recommendations for the balanced hand and the unbalanced hand, indicated by the particular advised action.

It will now be recognized that the operation of this device is extremely convenient, easy to master, and standard so as to make the playing of the game more uniform in all respects.

While this invention has been described with particular reference to the construction shown in the drawing, it is to be understood that such is not to be construed as imparting limitations upon the invention, which is best defined by the claims appended hereto.

Having thus dsecribed my invention, I claim as new and desire to secure by Letters Patent:

1. Contract bridge bidding apparatus comprising, in combination, a stack of substantially circular bid plates rotatably connected to each other for relative rotation about a common axis, each one of said bid plates having a specific point count value, a plurality of bid instructions imprinted in circularly spaced apart areas upon each such plate, each of said bid instructions being indicative of a specific bid attributable to a bridge hand of said specific point count value with respect to a previous bid, a substantially circular cover sheet rotatably mounted upon said stack of bid plates having a plurality of different prior bids imprinted in circularly spaced apart areas thereupon, a pointer carried by each one of said bid plates at a radial position substantially corresponding to the periphery of said cover sheet, window means in said bid plates and said cover sheet for viewing said bid instructions on said selected bid plate appropos to an actual prior bid indicated by said cover sheet in alignment with said pointer of said selected bid plate, said stack of bid plates comprising a plurality of substantially identical circular sections rotatable relative to each other about a common axis, each one of said bid plates including a radially outwardly extending tab consisting of two segments each having a length inversely proportional to the length of the other one of the segments, all of said tabs being visible adjacent to each other of said tabs, point count indicia imprinted upon said respective tab sections, all of said indicia being visible with said stack of bid plates in a starting position, and said common axis comprising a pin rotatably extending through the center of each of said circular sections of said bid plates, said tabs constituting means for rotating said cover sheet and all plates intermediate said cover sheet and a selected bid plate relative to said pointer of said selected bid plate.

2. Contract bridge bidding apparatus as set forth in claim 1, wherein said indicia imprinted upon said radially outwardly extending tab sections of said bid plates corresponds to said specific point count value of all possible bridge hands.

3. Contract bridge bidding apparatus as set forth in claim 2, wherein on each one of said bid plates said point count indicia is imprinted upon each facing side thereof, each said facing side of each said bid plate including a plurality of radially extending lines defining a plurailty of circumferentially spaced apart areas of substantially identical size and a second substantially circular cover sheet rotatably mounted on said pin on the opposite side of said stack of bid plates.

4. Contract bridge bidding apparatus as set forth in claim 3, wherein said cover sheet is of generally circular configuration substantially identical in size and shape to said central circular sections of each one of said bid plates, a pair of said cover sheets being provided one on each end of said stack of bid plates.

5. Contract bridge bidding apparatus as set forth in claim 4, wherein each one of said cover sheets includes identical indicia relating to various possibilities of said different prior bids.

6. Contract bridge bidding apparatus as set forth in claim 5, further comprising a pointer integral with each of said cover sheets adjacent the window thereof and rotatable with all of said bid plates above said selected bid plate for designating said bid instructions visible upon said selected bid plate through said window means.

7. Contract bridge bidding apparatus as set forth in claim 6, wherein said pointer carried by each one of said bid plates is immediately adjacent to the periphery of the circular section of each adjacent bid plate.

8. Contract bridge bidding apparatus as set forth in claim 7, wherein said window means comprises a radially extending opening in each one of said bid plates and said cover sheets in alignment with each other in said initial starting position of said apparatus, whereby said bid instructions are visible through the window openings of all of said bid plates and said cover sheet above said selected bid plate.

References Cited in the file of this patent

UNITED STATES PATENTS

| | | |
|---|---|---|
| 1,530,404 | Pearce | Mar. 17, 1925 |
| 1,719,853 | Rogers | July 9, 1929 |
| 2,560,647 | Higgins | July 17, 1951 |